United States Patent [19]

Sumikawa

[11] Patent Number: 5,060,707
[45] Date of Patent: Oct. 29, 1991

[54] OFF-THE-ROAD HEAVY DUTY PNEUMATIC RADIAL TIRES WITH SIDEWALL REINFORCING LAYERS

[75] Inventor: Yasushi Sumikawa, Tokyo, Japan

[73] Assignee: Bridgestone Corporation, Tokyo, Japan

[21] Appl. No.: 356,166

[22] Filed: May 24, 1989

[30] Foreign Application Priority Data

May 30, 1988 [JP] Japan ................................ 63-134081

[51] Int. Cl.$^5$ ........................ B60C 9/00; B60C 13/00; B60C 17/00
[52] U.S. Cl. .................................... 152/555; 152/517; 152/546
[58] Field of Search ............... 152/454, 524, 539, 546, 152/548, 554, 555, 517

[56] References Cited

U.S. PATENT DOCUMENTS

| | | | |
|---|---|---|---|
| 3,292,681 | 12/1966 | Travers | 152/555 |
| 4,067,372 | 1/1978 | Masson | 152/555 |
| 4,086,948 | 5/1978 | Suzuki | 152/554 |

*Primary Examiner*—Michael W. Ball
*Assistant Examiner*—Gregory J. Wilber
*Attorney, Agent, or Firm*—Sughrue, Mion, Zinn, Macpeak & Seas

[57] ABSTRACT

An off-the-road heavy duty pneumatic radial tire running on severely rough roads comprises a rubber reinforcing layer having a partial crescent shape in section and a JIS hardness of 55°~75° and a particular thickness distribution over a range from the bead portion to the vicinity of the belt end portion as a reinforcement for the sidewall portion, whereby the stable running performances and the carcass durability in bead portion can simultaneously be improved to give good resistance to lateral rolling and followability on uneven road surface to the vehicle running on rough roads.

7 Claims, 6 Drawing Sheets

Lateral Force F

OFF-THE-ROAD HEAVY DUTY PNEUMATIC RADIAL TIRES WITH SIDEWALL REINFORCING LAYERS

BACKGROUND OF THE INVENTION

1. Field of the Invention

This invention relates to off-the-road heavy duty pneumatic radial tires. More particularly it relates to an off-the-road heavy duty pneumatic radial tire which can attain the improvement of stable running performances by lessening the lateral rolling of the vehicle and the longitudinal pitching on unevenness of road surface when the vehicle is run on severely rough roads such as mines, forests, wild plains, digged ground or the like under full carrying load of heavy bulks such as ores, earth and sand or the like, and can simultaneously improve the carcass durability at the bead portion.

2. Related Art Statement

In extra-heavy load vehicles such as a large size dump truck or the like, when the vehicle is run on rough road, the tire treads in concave portions of the rough road at a side in the running direction or rides on convex portions and further is subjected to a large lateral force in the turning or the like, whereby a considerably large rolling feice is caused in the vehicle to undesirably drop a large amount of the carried earth and sand from the vehicle on a side of the running road.

On the other hand, the tire repeatedly generates a large deformation even in the longitudinal direction through the unevenness of the road, whereby the pitching is caused in the vehicle. In case of a rear dump truck, the carried load undesirably drops backward.

When the material dropped exists on the running road, there is a fear of causing an unexpected accident upon the riding of the following vehicle on the dropped material. In order to avoid the occurrence of such accidents, the work for removing the dropped matter is frequently conducted, which increases the maintenance cost.

As the tire for this type of the vehicle, lateral rigidity enough to resist against a large lateral force generated due to the unavoidable unevenness of road or turning is required for the resistance to lateral rolling, while a followability causing an adequate buffering action is required against the deformation in longitudinal direction. When the rigidity of the sidewall portion is sufficiently increased for ensuring the resistance to lateral rolling, the resistance to deformation in the longitudinal direction of the tire tends to excessively increase, whereby pitching becomes violent, so that the resistance to rolling conflicts with followability.

Therefore, in order to simultaneously establish resistance to lateral rolling and the proper followability in the running on rough road, it is important to ensure the stable running performances or the stability performances. At the same time it is required to have an excellent carcass durability performance in the bead portion. That is, the tire is demanded to simultaneously possess these performances.

In order to improve the above stability performances, it has hitherto been attempted to arrange a portion having a thicker rubber gauge in the main carcass portion of the carcass ply, particularly at an inside of the sidewall region. In this case, however, the followability of tire deformation on road surface is poor when the tire is run a on severely rough road. Furthermore, since the rubber gauge is preferentially increased in the sidewall region, the load bearing of the bead portion in the tire increases and the tendency of heat build up becomes strong to degrade the carcass durability in the bead portion. Moreover, the load bearing at both side end portions of the belt increases to lower the resistance to separation failure at the side ends of the belt. Further it is undesirably obliged to increase the tire weight.

On the other hand, Japanese Patent Application Publication No. 56-28721 discloses a heavy duty pneumatic radial tire, wherein a turnup end of a turnup portion of a carcass ply is made higher a position of maximum width of the carcass ply A flexible rubber layer having a JIS hardness of about 46° (corresponding to Shore A hardness of 48°) is interposed between the main carcass portion and the turnup portion in the carcass ply to separate the main carcass port-ion and the turnup portion from each other. By this technique the enhancement of the rigidity of the sidewall portion and the improvement of the durability in the bead portion can be realized.

In this tire, a flexible rubber having a triangular shape in section or a so-called cushion rubber having, for example, a JIS hardness of 46°~48° is arranged between each side end portion of the belt and the carcass ply for mitigating the shearing stress, which is not clearly disclosed in the above publication, and further a flexible rubber having, for example, a JIS hardness of about 42° is generally used as a sidewall rubber over a region ranging from the bead portion to the buttress portion for ensuring the resistance to flex fatigue. Such a structure is suitable in view of the followability on road surface in the running on rough road. However, large deformation is particularly caused at the buttress portion near the ground contact region through lateral force generated in the running of the tire as compared with the case of applying no lateral force to stagger the tire in the axial direction, so that the degradation of resistance to lateral rolling can not still be avoided.

In general, the heavy duty pneumatic radial tire is repeatedly subjected to a large deformation in the curved region of the bead portion along the rim under an influence of a load acting to the tire, and the cord break-up of the carcass ply (hereinafter referred to as CBU) is apt to be caused in the inside of the bead portion through compression strain. However, a special countermeasure for such a problem is not taken in the tire.

SUMMARY OF THE INVENTION

It is an object of the invention to provide an off-the-road heavy duty pneumatic radial tire completely possessing stability performances causing no disadvantage due to the dropping of the carried matter from the vehicle running on off-the-road, particularly severely up and down ground under heavy bulk loading as well as excellent carcass durability at the bead portion.

According to the invention, there is the provision of an off-the-road heavy duty pneumatic radial tire comprising a pair of bead portions, at least one carcass ply of radial or substantially radial arrangement extending between the bead cores and wound around each bead core to form a main carcass portion and a turnup portion, a stiffener extending between the main carcass portion and the turnup portion above the bead core so as to gradually reduce the thickness along the outer surface of the main carcass portion and made from a hard rubber stock, and a belt of a cross laminated structure superimposed about an outer periphery of a crown region of the main carcass portion and composed of plural cord layers, characterized in that a rubber reinforcing layer having a partial crescent shape in section and a JIS hardness of 55°~75° is arranged over a region ranging from a height level of an inner face of the turnup portion corresponding to a contact boundary between outer surface of the bead portion and rim flange when the tire is mounted onto a normal rim, and the rubber reinforcing layer has a thickness distribution that the thickness of the rubber reinforcing layer gradually increases along the outer surfaces of the stiffener and the main carcass portion toward the top of the stiffener and has a substantially uniform gauge t between the main carcass portion and the turnup portion and further increases and then decreases through a thickest position showing a maximum gauge T of not less than 3 times but not more than 6 times of the above gauge t.

In the preferred embodiments of the invention, a ratio of height level of the end of the turnup portion h to height level of tread end H is within a range of 0.32~0.61, and the JIS hardness of the stiffener is higher by 15°~25° than that of the rubber reinforcing layer, and the rubber reinforcing layer has a uniform gauge t over a range of 3 15 mm between the main carcass portion and the turnup portion in a normal direction on the surface of the main carcass portion and has a maximum gauge T from an intersect between rubber boundary line near to the belt and tangent line at the maximum width position of the main carcass portion along the normal direction on the main carcass portion, and the maximum gauge T is 15~70 mm.

BRIEF DESCRIPTION OF THE DRAWINGS

The invention will be described with reference to the accompanying drawings, wherein.

DESCRIPTION OF THE PREFERRED EMBODIMENTS

Figure 1:
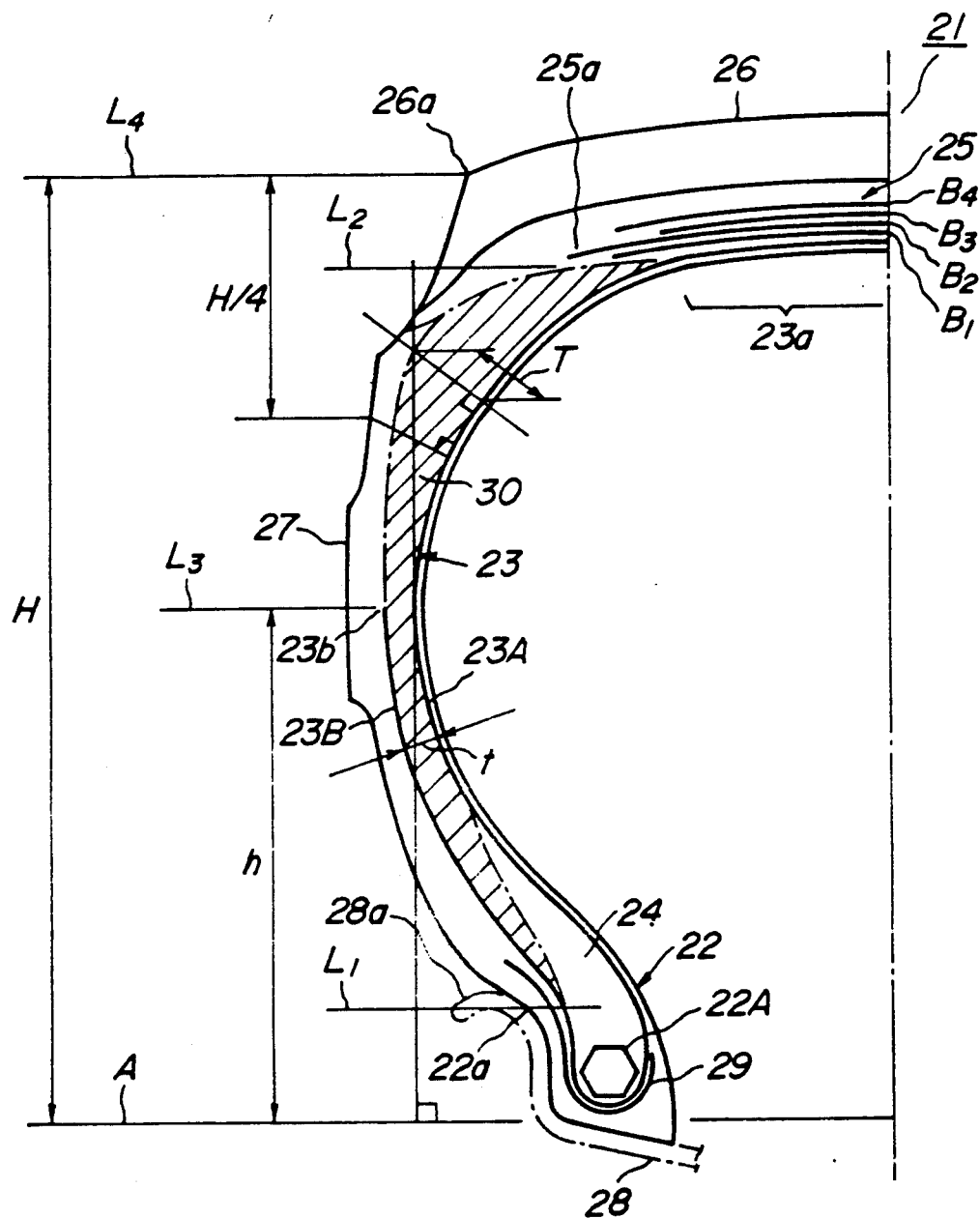
FIGS. 1 to 3 are partial sectional views of some embodiments of the heavy duty pneumatic radial tire according to the invention, respectively.
Figure 2:
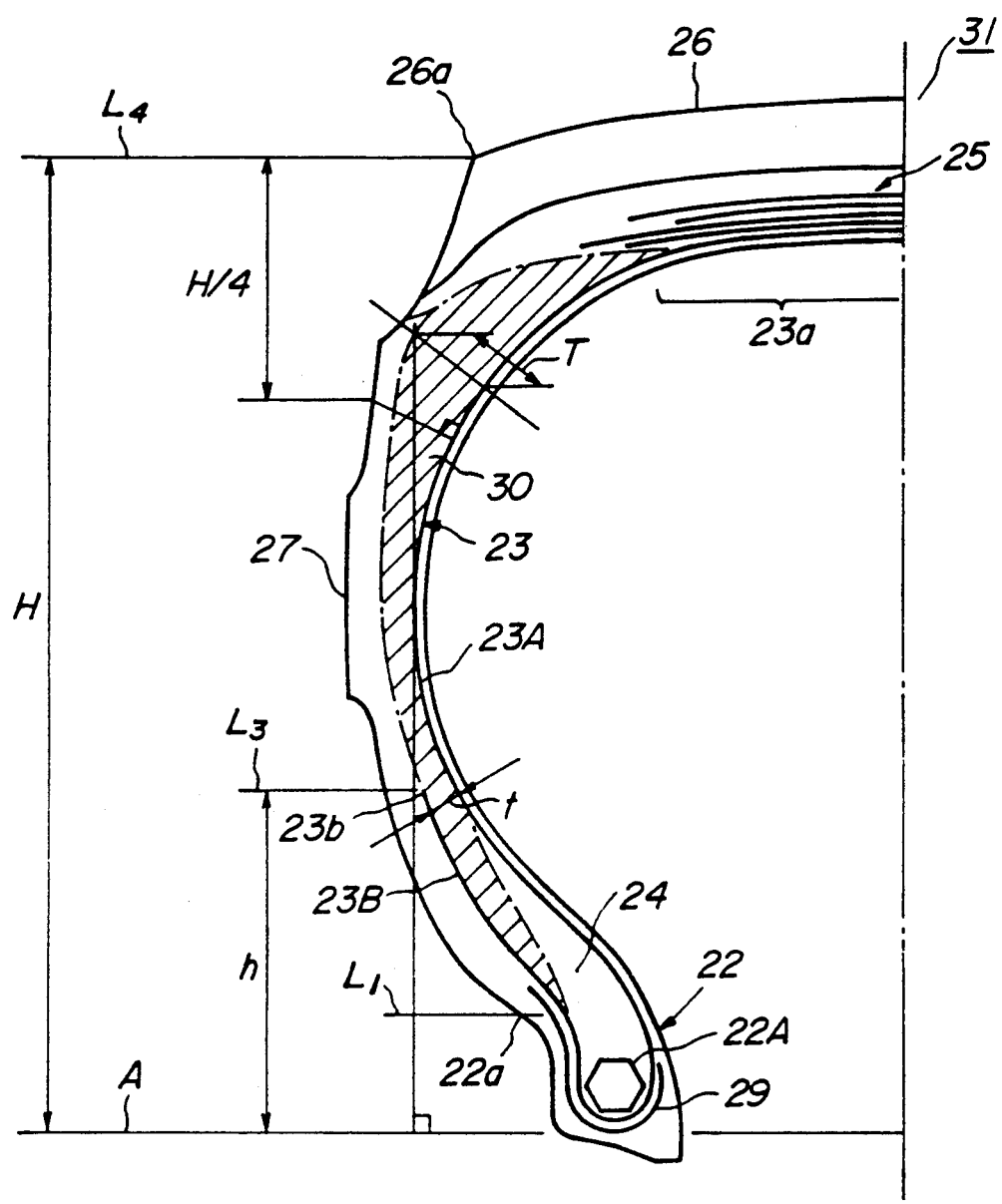
Figure 3:
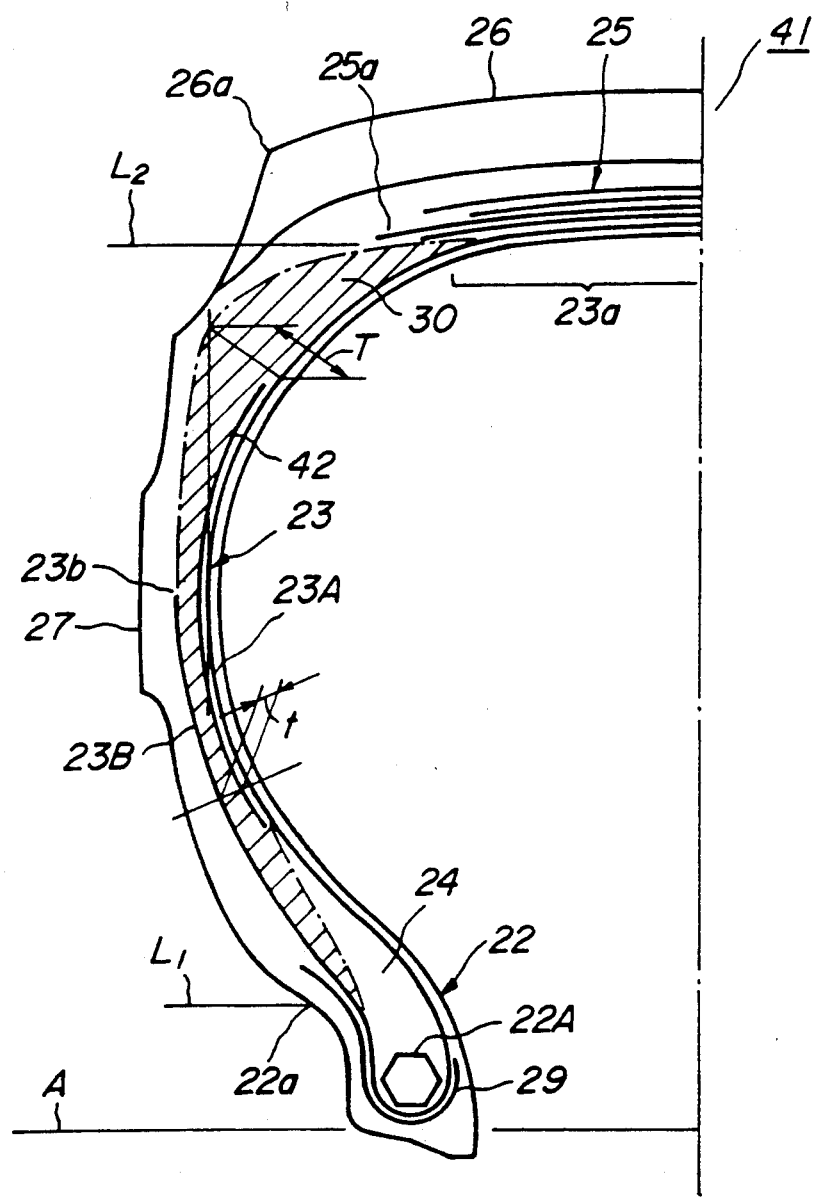

In FIGS. 1 to 3 illustrate concrete embodiments of the off-the-road heavy duty pneumatic radial tire according to the invention (right half portion is omitted), respectively.

In a tire 21 of FIG. 1, a bead core 22A is arranged in a bead portion 22, and a carcass ply 23 of radial or substantially radial arrangement is wound around the bead core 22A from the inside of the tire 21 toward the outside thereof to form a main carcass portion 23A and a turnup portion 23B. Further, a stiffener 24 made from a hard rubber stock is arranged between the main carcass portion 23A and the turnup portion 23B on the bead core 22A to gradually reduce the thickness along the outer surface of the main carcass portion 23A. Moreover, a belt 25 of a cross laminated structure composed of four cord layers $B_1$, $B_2$, $B_3$ and $B_4$ is arranged on an outer periphery of a crown region 23a of the main carcass portion 23A.

In FIG. 1, numeral 26 is a tread rubber reinforced with the belt 25, numeral 27 a sidewall rubber, numeral 28 a normal rim mounting the tire 21, and numeral 29 a chafer.

According to the invention, a rubber reinforcing layer 30 is arranged as a reinforcement for the sidewall portion on the outer surfaces of the stiffener 24 and the main carcass portion 23A smoothly connecting to the top of the stiffener. In this case, the rubber reinforcing layer 30 is arranged over a region ranging from a height level $L_1$ of the inner face of the turnup portion 23B corresponding to a contact boundary 22a between the outer surface of the bead portion 22 and the inner surface of the normal rim 28 to a height level $L_2$ just beneath each side edge of the belt 25.

The rubber reinforcing layer 30 has a partial crescent shape in section having a thickness distribution such that the thickness of the rubber reinforcing layer gradually increases between the turnup portion 23B and the stiffener 24 along the outer surfaces of the stiffener 24 and the main carcass portion 23A toward the top of the stiffener 24. It has substantially a uniform gauge t between the main carcass portion 23A and the turnup portion 23B, and further increases and then decreases through a thickest position having a maximum gauge T of not less than 3 times but not more than 6 times of the above gauge t.

Particularly, the rubber reinforcing layer 30 has a JIS hardness of 55°~75°, preferably 60°~70°, while the JIS hardness of the stiffener 24 is preferable within a range of 70°~90° higher by 15°~25° than that of the rubber reinforcing layer. Further, the sidewall rubber 27 is a flexible rubber having a JIS hardness of about 42°, and the tread rubber 26 is usually selected from rubbers having a JIS hardness of 58°~70°.

In a tire 31 of FIG. 2, the height level of the end 23b of the turnup portion 23B is lower than the case of FIG. 1, while in a tire 41 of FIG. 3, a protect ply 42 is interposed between the main carcass portion 23A and the rubber reinforcing layer 30 along the outer surface of the main carcass portion.

The height h at a level $L_3$ of the end 23b of the turnup portion 23B is variable within a range of 0.32~0.61 with respect to a level $L_4$ of the tread end 26a. And also, it is preferable that the protect ply 42 is arranged over a region ranging from the top of the stiffner 24 to the position of the maximum gauge T of the rubber reinforcing layer 30.

The rubber reinforcing layer 30 peculiarly arranged according to the invention has a thickness distribution that the thickness gradually increases between the stiffner 24 and the turnup portions 23B along the outer surfaces of the stiffener 24 and the main carcass portion 23A over a region ranging from the height level $L_1$ of the turnup portion 23B corresponding to the contact boundary between the outer surface of the bead portion 22 and the rim flange 28a of the normal rim 28 to the vicinity of the height level $L_2$ just beneath each side edge of the belt 25. It has substantially a uniform gauge t between the main carcass portion and the turnup portion and further increases and decreases through the thickest position showing the gauge T of not less than 3 times of the gauge t until the arrival at the side edge of the belt 25, and a partial crescent shape in section having a JIS hardness of 55°~75°. Therefore, the rubber reinforcing layer 30 considerably contributes to increase the lateral rigidity from the buttress of the tire to the tread end thereof, whereby the deformation in the lateral direction of the carcass ply of the tire under heavy load is effectively controlled from the buttress position of the tire to the tread end 26a to enhance the resistance to lateral rolling in the tire.

Further, the rigidity in radial direction of the sidewall portion of the tire is properly held by stopping the end of the turnup portion to an adequate position, whereby the followability on the unevenness of the road surface is developed.

In this way, the stability performance of the tire is considerably improved, and also the deformation input to the bead portion is dispersed and the concentration of shearing strain int he both side edge portions of the belt is avoided. Thus, the carcass durability in the bead portion can be improved while holding the improvement of stable running performances and the belt durability.

The JIS hardness of the rubber reinforcing layer is within a range of 55°~75°, preferably 60°~70°.

When the JIS hardness is less than 55°, the deformation of the bead portion near the region contacting with the rim flange under loading becomes excessive and it is difficult to ensure carcass durability, when it exceeds 75°, there is a fear of generating the separation at the boundary between the carcass ply 23 and the rubber reinforcing layer 30 at the large deformation of the bead portion. It is difficult to ensure the carcass durability.

Further, the maximum gauge T of the rubber reinforcing layer 30 is necessary to be 3~6 times of the gauge t at the uniform portion being about 4~12 mm. When it is less than 3 times, the displacement in the lateral direction of the buttress portion becomes too large if the stress in axial direction is applied to the tread and the expected resistance to lateral rolling is not obtained. When it exceeds 6 times, the disadvantage is caused in view of the heat build-up.

The ratio of height h of the end 23b of the turnup portion 23B measured from a bead base A to height H of the tread end is within a range of 0.32~0.61, preferably not more than 0.56. When the ratio h/H is less than 0.32, the effect of controlling the deformation of the tire sidewall portion is insufficient under an influence of various forces from an uneven road surface, and consequently the stability performances are degraded. Also the CBU trouble of the bead portion is apt to be caused, when it exceeds 0.61, the effect of controlling the deformation of the tire sidewall portion becomes inversely too large and the load bearing by the tread portion and the bead portion becomes large. Consequently there is a fear of causing problems that the separation failure is apt to be caused at the end portion of the belt in the tread portion and CBU is apt to be caused at the turnup portion above the rim flange in the bead portion.

In the first embodiment shown in FIG. 1, the heavy duty pneumatic radial tire 21 has a tire size of 24.00 R35 and comprises a pair of annular bead portions 22. A single ply a carcass 23 consisting of a main carcass portion 23A toroidally extends between bead cores 22A is arranged in the bead portions 22 and containing cords arranged substantially in a radial direction, i.e. at an angle of 90° with respect to the circumferential direction A turnup portion 23B connects from the main carcass portion 23A and extending outward around the bead core 22A in the radial direction.

Numeral 29 is a wire chafer reinforcing the bead portion 22.

The stiffener 24 is existent between the main carcass portion 23A and the turnup portion 23B and taperingly extends above the bead core 22A along the main carcass portion 23A to integrally unite with the rubber reinforcing layer 30 as mentioned later.

In this embodiment, the belt 25 of four layer structure is arranged outside the crown region 23a of the carcass 23 in the radial direction. The tread rubber 26 is arranged outside the belt 25 in the radial direction to cover the belt 25.

Symbol A is a base line passing through a bead base of the bead portion 22 and in parallel to the rotational axis, which corresponds to a standard line equal to a normal rim diameter.

The carcass ply 23 is composed of rubberized steel cords having a twisting structure of $1 \times 3 + 9 + 15 + 1$, wherein the ratio of height h of the end 23b of the turnup portion 23B measured from the base line A to height H measured from the end 26a of the tread 26 to the base line A is 0.5.

Between the main carcass portion 23A and the turnup portion 23B is sandwiched and formed a laminate structure of the rubber reinforcing layer 30 and the stiffener 24 communicating with the rubber reinforcing layer 30, whereby the more preferable laminating effect can be obtained in the turnup portion 23B.

The JIS hardness of rubber forming the stiffener 24 is 78°, which is higher by 18° than the JIS hardness (60°) of rubber forming the rubber reinforcing layer 30.

The belt 25 is composed of first layer $B_1$, second layer $B_2$, third layer $B_3$ and fourth layer $B_4$ viewing from the side of the carcass 23 toward the side of the tread 26. The first layer $B_1$ is comprised of rubberized steel cords having a twisting structure of $7 \times 7 + 1$ and arranged at a cord angle of 20° with respect to the equator of the tire upward to the right when viewed from the side of the tread 26 (hereinafter referred to as R20). Similarly, the second layer $B_2$ is comprised of rubberized steel cords having a twisting structure of $7 \times 7 + 1$ and arranged at a cord angle of 20° with respect to the equator of the tire upward to the left when viewed from the side of the tread 26 (hereinafter referred to as L20). In the third layer $B_3$, the twisting structure is $3 \times 7$ and the cord direction is R20, and in the fourth layer $B_4$, the twisting structure is $3 \times 7$ and the cord direction is L20.

Numeral 27 is a sidewall made from a flexible rubber having a good flexibility and a JIS hardness of 42°, which covers the side region of the carcass ply 23 from the vicinity of the tread end to the bead portion 22.

The rubber reinforcing layer 30 (distinctively shown by shadowed lines) is made from slightly hard rubber having a JIS hardness of 60° and arranged over a range from the vicinity of the contact point 22a, which starts to contact the outer surface of the bead portion 22 with the rim flange 28a of the rim 28 (shown by dot-dash lines) when the tire is mounted onto the rim, to the vicinity of each side edge portion 25a of the belt 25. The rubber reinforcing layer 30 is thus existent between the outer surfaces of the stiffener 24 and the main carcass portion 23A and the inner surface of the turnup portion 23B over a range from the bead portion 22 to the end 23b of the turnup portion 23B and along the outer surface of the main carcass portion 23A outward from the end 23b of the turnup portion 23B in the radial direction.

That is, the rubber reinforcing layer 30 has a so-called partial crescent shape in section that the thickness gradually increases between the turnup portion 23B and the stiffener 24 toward the top of the stiffener 24 along the outer surfaces of the stiffener 24 and the main carcass portion 23A. It extends over a range from a height level $L_1$ of the inner surface of the turnup portion 23B corresponding to the contact boundary between the outer surface of the bead portion 22 and the rim flange of the normal rim 28 to a height level $L_2$ just beneath the side edge of the belt 25. It has substantially a uniform gauge t of 7 mm between the main carcass portion 23A and the turnup portion 23B and further increases and then decreases through a thickest position showing a maximum gauge T of 4.3 times of the above gauge t until the arrival to a position just beneath the side edge of the belt 25.

The rubber reinforcing layer 30 has a maximum gauge T of 30 mm above a normal line drawn to the main carcass portion 23A at a position located from the tread end 26a toward the side of the bead portion only by a distance H/4 when the height H from the bead base to the tread end 26a is divided into four equal parts. By this technique the deformation in lateral direction of the tire is properly controlled. Further, the preferable followability on uneven road surface can be developed by favorable synergistic effect of the thin thickness structure of the rubber reinforcing layer 30 from the end 23b of the turnup portion to the bead portion 22 and the lamination structure of rubber reinforcing layer and the stiffener at the ratio h/H of 0.5.

Moreover, the rubber reinforcing layer 30 is arranged to gradually reduce the thickness along the stiffener 24 in the bead portion 22, whereby the deformation of the carcass ply through an external input from the rim flange is favorably dispersed to restrain the strain inside the bead portion. This serves to improve the carcass durability in the bead portion. Thus, the stability performances and the carcass durability performance are simultaneously achieved by such a preferable arrangement of the carcass ply 23 and the rubber reinforcing layer 30, and also the tire weight is reduced and the heat build-up inside the tire is largely decreased.

In the second embodiment shown in FIG. 2, the same parts as in the first embodiment are represented by the same numerals, respectively. This tire 31 has a tire size of 18.00 R35 and has the same structure as in the first embodiment except that the ratio h/H is 0.35, T is 18.5 mm, t is 4.5 mm and T/t is 4.1. This embodiment is suitable when the bearing load is lower than that of the first embodiment.

In the third embodiment shown in FIG. 3, the same parts as in the first embodiment are represented by the same numerals, respectively. This tire 41 has a tire size of 36.00 R51.

The third embodiment has the same structure as in the first embodiment except that a protect ply 42 comprised of rubberized steel cords having a twisting structure of $3 \times 7$ is interposed between the side part of the main carcass portion 23A of the carcass 23 and the rubber reinforcing layer 30. The value of T is 57.5 mm, t is 12.5 mm, T/t is 4.6, h/H is 0.55, the steel cord used in the carcass 23 has a twisting structure of $7 \times (1 \times 3 + 9 + 15) + 1$ and the steel cord used in all of the first to fourth layers of the belt 25 has a twisting structure of $7 \times 7 + 1$.

This embodiment is suitable when the bearing load is larger than that of the first embodiment.

Then, the effect of the invention will be described by using two kinds of test tires (invention tire and comparative tire).

Figure 4:
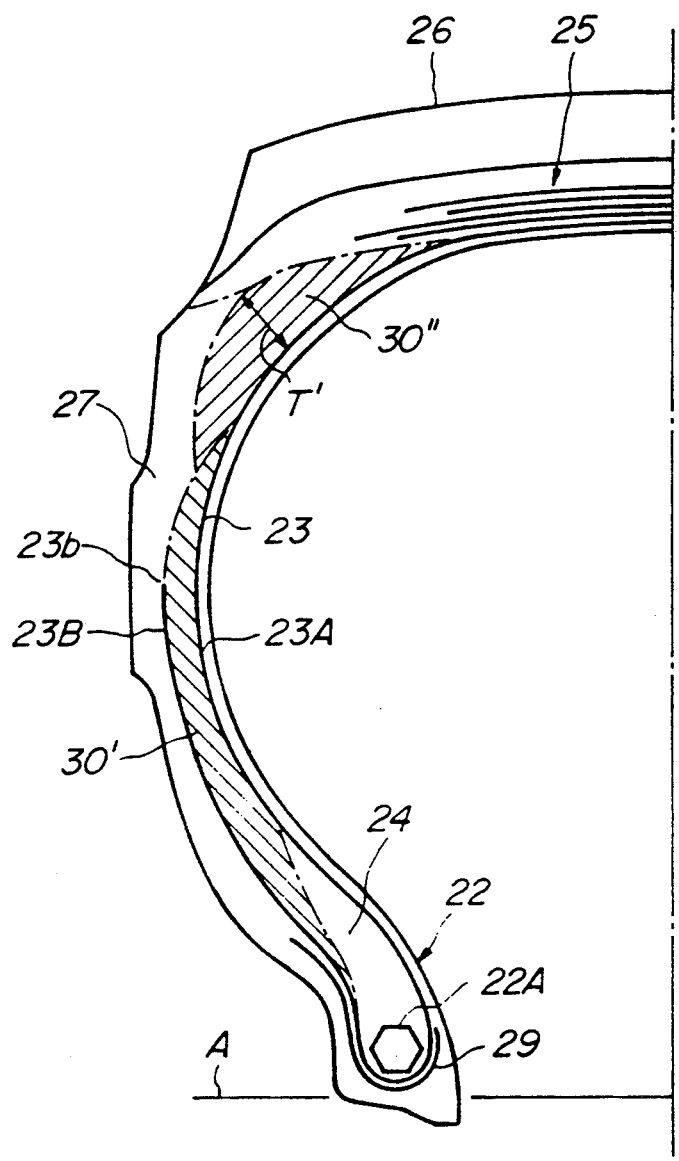
FIGS. 4 and 5 are partial sectional views of comparative tire and conventional tire, respectively.
Figure 5:
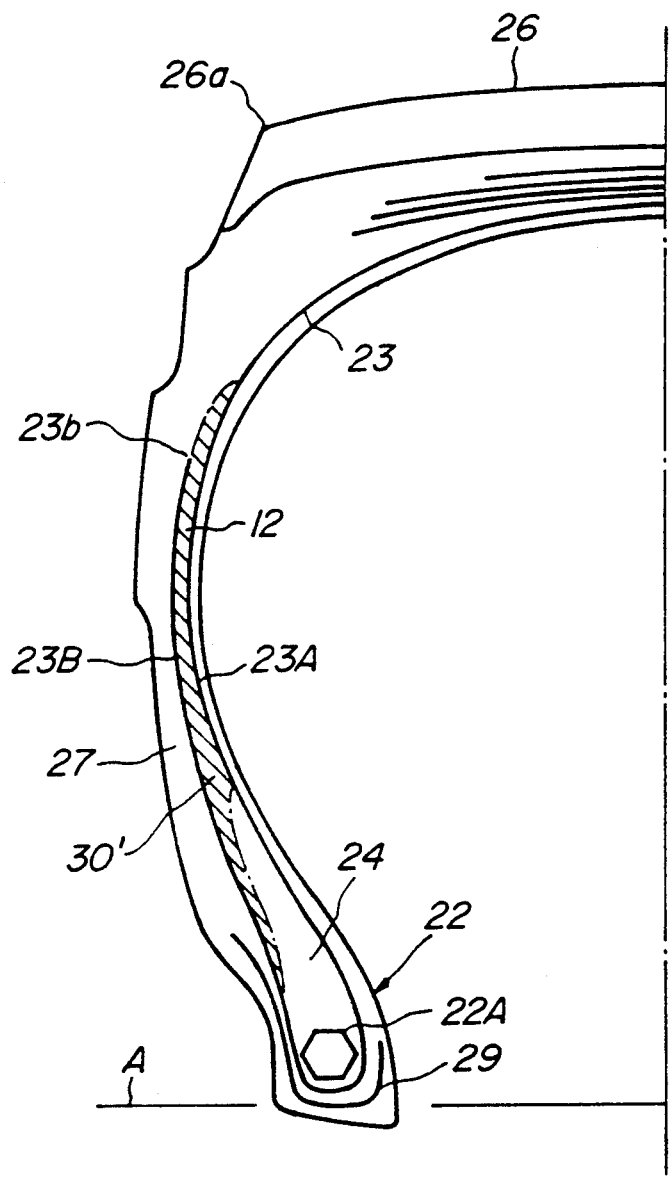

The invention tire was particularly the first embodiment of FIG. 1, while a heavy duty pneumatic radial tire manufactured as shown in FIG. 4 was used as a comparative tire and a heavy duty radial tire disclosed in Japanese Patent Application Publication No. 56-28721 (see FIG. 5) was used as a conventional tire. The tire size in these tires was 24.00 R35, and the material, structure and shape were the same in FIGS. 1, 4 and 5 except for the shadowed portion.

In order to further clarify the comparison in performances of the tire according to the invention with those of the comparative and conventional tires, a soft cushion rubber (not shown in FIG. 5) was arranged from the belt end toward the buttress portion in the conventional tire, while in the comparative tire, a rubber 30″ having a JIS hardness of 60° and a substantially triangular shape in section was arranged instead of the cushion rubber. The maximum thickness T′ was 30 mm as in the maximum gauge T of the rubber reinforcing layer 30 in the invention tire corresponding to 4.3 times of the gauge t=7 mm and the ratio h/H was 0.5. Moreover, in the conventional tire, the rubber reinforcing layer 30′ had t=7 mm and h/H=0.65.

The tests on lateral rigidity and bead durability were performed as static properties.

At first, the lateral rigidity was evaluated by measuring a reaction force (kgf) of the tire per displacement (mm) when the tire was inflated under a normal internal pressure of 7.0 kgf/cm$^2$ and a forced displacement was applied in the lateral direction (axial direction) of the tire under a normal load of 18.500 kg.

Then, as the bead durability test, there was adopted a so-called step loading system while running on a large size indoor drum testing machine of 5 m in diameter at a speed of 20 km/hr under a normal internal pressure (7.0 kgf/cm$^2$), when the tire was trained under a load corresponding to 40% of the normal load for 12 hours for avoiding failures of the tread portion and run under a load corresponding to 60% of the normal load for 12 hours and further under a load corresponding to 80% of the normal load for 12 hours and under a load corresponding to 100% of the normal load for 24 hours. Then the load was raised by 10% of the normal load every the running of 24 hours.

The failure was judged by the bulging of the bead portion on appearance, and thereafter CBU and the like of cords in the turnup portion were confirmed by cutting the tire as a final judgement.

Figure 6:
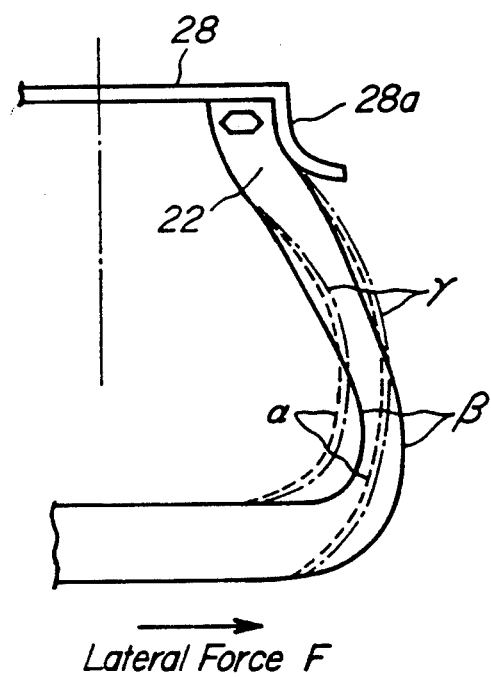
FIGS. 6 and 7 are schematic views illustrating deformation behaviors of buttress portion and bead portion, respectively.

Moreover, the behavior of deformation in the buttress portion was shown in FIG. 6 in the test for the resistance to lateral rolling. In this case, when lateral force F was applied to the tire, the buttress portion of the conventional tire considerably deformed from broken lines $\alpha$ applying no lateral force F to solid lines $\beta$, while in the invention tire, a very slight deformation from the initial state of broken lines $\alpha$ toward dot-dash lines $\gamma$ was merely caused.

Figure 7:
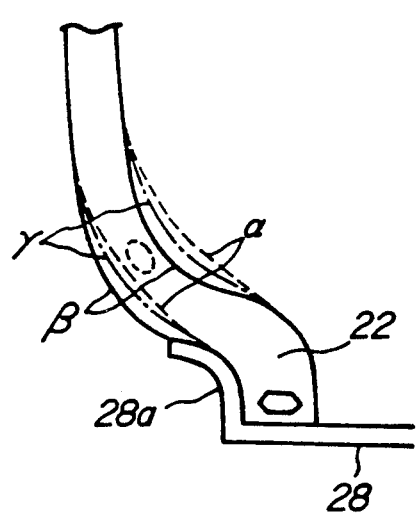

In the test for the carcass durability of the bead portion, as shown in FIG. 7, the bead portion of the conventional tire considerably deformed from broken lines $\alpha$ to solid lines $\beta$ along the rim flange 28a of the normal rim 28, while according to the invention, slight deformation was merely caused from the broken lines $\alpha$ to dot-dash lines $\gamma$.

The test results are shown in the following Table 1, wherein numerical values are represented by an index on the basis that the comparative tire of FIG. 4 is 100.

Moreover, the bead durability was evaluated by a total running time.

In Table 1, the larger the numerical value, the better the property.

TABLE 1

| | Invention tire | Comparative tire | Conventional tire |
|---|---|---|---|
| Lateral rigidity (%) | 105 | 100 | 94 |
| Bead durability (%) | 116 | 100 | 92 |

As mentioned above, according to the invention, when the vehicles are run on severely uneven and rough roads while fully carrying heavy and bulk loads, the resistance to lateral rolling and the followability on road surface in the vehicle can simultaneously be possessed by largely improving the stable running performances of the heavy duty pneumatic radial tire used in these vehicles and also advantageously improving the carcass durability performance in the bead portion.

What is claimed is:

1. An off-the-road heavy duty pneumatic radial tire comprising; a pair of bead portions, at least one carcass ply of radial or substantially radial arrangement extending between bead cores and wound around each bead core to form a main carcass portion and a turnup portion h, a stiffener extending between the main carcass portion and the turnup portion above the bead core to gradually reduce a thickness of said stiffener along a radially outer surface of the main carcass portion and made from a hard rubber stock, a belt comprising a cross laminated structure superimposed about a radially outer periphery of a crown region of the main carcass portion and composed of plural cord layers, a rubber reinforcing layer having a partial crescent shape in section and a JIS hardness of 55°–75° arranged over a region ranging from a position of a radially inner face of the turnup defined by a contact boundary between outer surface of the bead portion and rim flange when the tire is mounted onto a normal rim, to a position just beneath each side edge of the belts, a ratio of height level of the turnup portion h to a height level of tread end H, h/H being 0.32–0.61, said rubber reinforcing layer has a thickness distribution such that the thickness of the rubber reinforcing layer gradually increases along radially outer surfaces of the stiffener and the main carcass portion toward the top of the stiffener and has a substantially uniform gauge t of 3–15 mm between the main carcass portion and the turnup portion a range of 3–15 mm between the main carcass portion and the turnup in a normal direction on the surface of the main carcass portion over a region ranging from the end of the stiffener to the end of the turnup portion, and further increases and then decreases through a thickest position having a maximum gauge T of not less than 3 times but not more than 6 times t, said maximum gauge T being 15–70 mm.

2. The off-the-road heavy duty pneumatic tire according to claim 1, wherein each of said carcass ply and said belt is comprised of steel cords.

3. The off-the-road pneumatic radial tire according to claim 1 wherein a protect ply containing steel cords is arranged between said carcass ply and said rubber reinforcing layer along the outer surface of said carcass ply.

4. The off-the-road pneumatic radial tire according to claim 3, wherein said protect ply extends over a region ranging from the top of the stiffener to substantially the position of the maximum gauge T of the rubber reinforcing layer.

5. The off-the-road pneumatic radial tire according to claim 1, wherein said rubber reinforcing layer has a JIS hardness of 60°–70°.

6. The off-the-road heavy duty pneumatic radial tire according to claim 1, wherein the JIS hardness of the stiffener is higher by 15°~25° than that of the rubber reinforcing layer.

7. The off-the-road heavy duty pneumatic radial tire according to claim 1, wherein the rubber reinforcing layer has a maximum gauge T from an intersect between rubber boundary line near to the belt and tangent line at the maximum width position of the main carcass portion along the normal direction on the main carcass portion.

* * * * *